United States Patent [19] [11] 4,176,169
Mysels [45] Nov. 27, 1979

[54] METHOD OF EXTRACTING IODINE FROM LIQUID MIXTURES OF IODINE, WATER AND HYDROGEN IODIDE

[75] Inventor: Karol J. Mysels, La Jolla, Calif.

[73] Assignee: General Atomic Company, San Diego, Calif.

[21] Appl. No.: 921,435

[22] Filed: Jul. 3, 1978

[51] Int. Cl.² .................................................. C01B 17/14
[52] U.S. Cl. ...................................... 423/501; 423/488; 210/21
[58] Field of Search ........... 423/500, 501, 481, 321 R, 423/488, DIG. 14; 210/21, 60, 62

[56] References Cited
U.S. PATENT DOCUMENTS

| 3,792,154 | 2/1974 | Cathers et al. | 423/500 |
| 3,803,295 | 4/1974 | Cathers et al. | 423/500 |
| 4,089,940 | 5/1978 | Norman et al. | 423/500 |

Primary Examiner—Earl C. Thomas

Attorney, Agent, or Firm—Fitch, Even & Tabin

[57] ABSTRACT

The components of a liquid mixture consisting essentially of HI, water and at least about 50 w/o iodine are separated in a countercurrent extraction zone by treating with phosphoric acid containing at least about 90 w/o $H_3PO_4$. The bottom stream from the extraction zone is substantially completely molten iodine, and the overhead stream contains water, HI, $H_3PO_4$ and a small fraction of the amount of original iodine.

When the water and HI are present in near-azeotropic proportions, there is particular advantage in feeding the overhead stream to an extractive distillation zone wherein it is treated with additional concentrated phosphoric acid to create an anhydrous HI vapor stream and bottoms which contain at least about 85 w/o $H_3PO_4$. Concentration of these bottoms provides phosphoric acid infeed for both the countercurrent extraction zone and for the extractive distillation zone.

13 Claims, 1 Drawing Figure

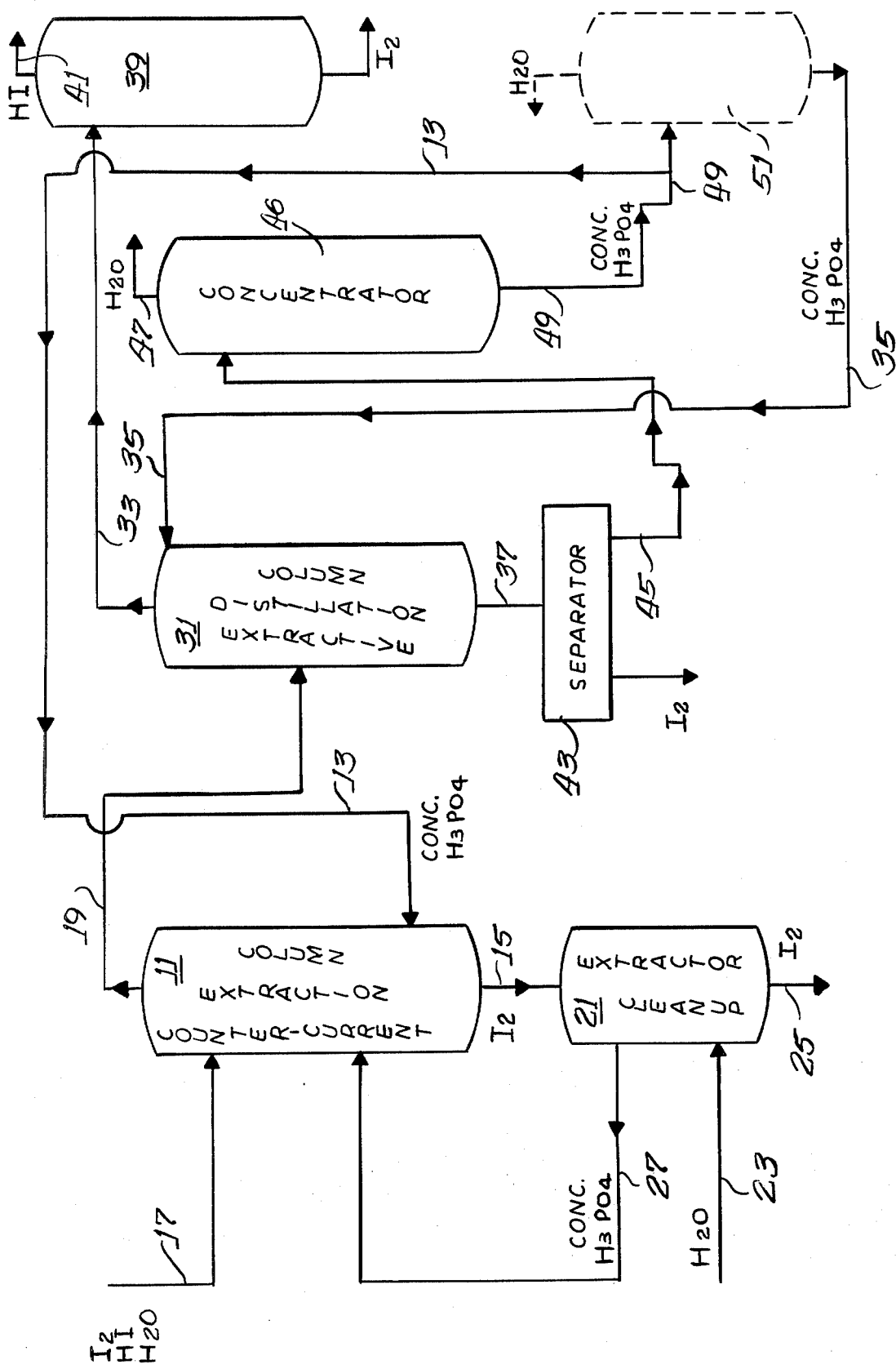

METHOD OF EXTRACTING IODINE FROM LIQUID MIXTURES OF IODINE, WATER AND HYDROGEN IODIDE

BACKGROUND OF THE INVENTION

This invention relates to a process for the recovery of iodine, and more particularly to a process for the separation of the components from a mixture of iodine, water, and hydrogen iodide.

Although various processes have been heretofore suggested and employed for the separation of elemental iodine from mixtures containing iodine, water, and hydrogen iodide, none of these has been completely satisfactory and without attendant disadvantages. For example, one such method involves the conversion of the hydrogen iodide to iodine, which may be unsatisfactory for a number of reasons—particularly when, in addition to recovering iodine, recovery of hydrogen iodide is also desired. Still another process is described in U.S. Pat. No. 2,143,222 (Jan. 10, 1939) wherein the mixture is treated with chlorine to precipitate free iodine and create a mixture containing hydrochloric acid. This process also has readily apparent disadvantages.

STATEMENT OF THE INVENTION

It has been found that, by subjecting a liquid mixture of iodine, water, and hydrogen iodide to countercurrent extraction with concentrated phosphoric acid at a temperature above the melting point of iodine, a surprisingly clean separation of molten iodine from the hydrogen iodide can be accomplished without any significant chemical reaction with the hydrogen iodide. As a result, the heavier stream from the extraction zone may be 97 percent or more molten iodine. The lighter stream can be fed to an extractive distillation column wherein further treatment with concentrated phosphoric acid results in the creation of an overhead stream, a major portion of which is hydrogen iodide. The bottoms from the extractive distillation step can be concentrated to supply concentrated phosphoric acid to the two previous steps. The overall process is of particular value when the water and hydrogen in the original liquid mixture are present in subazeotropic or near-azeotropic proportions, as the extractive distillation step permits the azeotrope to be broken so that hydrogen iodide can be obtained by distillation.

The foregoing and other advantages of the invention will be more fully appreciated from the following detailed description of processes embodying various features of the invention, particularly when read in conjunction with the accompanying figure illustrating a flow diagram which depicts a presently preferred embodiment of a separation process for recovering $I_2$, HI and $H_2O$ from a liquid solution or mixture.

DESCRIPTION OF THE PREFERRED EMBODIMENTS

The invention is considered to be useful for the separation of iodine, in its elemental state, from liquid mixtures consisting essentially of iodine, water, and hydrogen iodide. In this respect, the liquid mixtures may contain other substances which are present in such proportions as to be inconsequential from a standpoint of the overall extraction, and which preferably should not react with components of the mixture or with the concentrated phosphoric acid. The advantages of the invention are more completely realized when the liquid mixture contains iodine in an amount of at least about 50 w/o (weight percent) although it is operative at lower percentages. Preferably, the liquid mixture which is being treated has an iodine content of 70 w/o or more, and the overall process exhibits specific additional advantages when the iodine constitues at least about 75 w/o and also when the hydrogen iodide is present, in relation to the water, in a proportion near that of the azeotrope.

The Bunsen reaction: $2H_2O + SO_2 + I_2 \rightarrow H_2SO_4 + 2HI$ has long been known and has recently been proposed as the main step in an overall thermochemical process for the production of hydrogen from water utilizing the high-temperature heat available from nuclear reactors, solar energy collectors, and the like. In carrying out the Bunsen reaction, by using an excess of iodine, a two-phase reaction mixture is obtained wherein the major portion of the desired product, i.e., hydrogen iodide, is present in the more dense, iodine-containing phase. Once the two phases are separated, and excess sulfur dioxide is removed from the more dense phase, the problem remains to separate the liquid mixture into its components, namely, iodine, hydrogen iodide and water.

In a system which is formed in such a manner, the iodine may constitute 40 or 50 w/o of more of the liquid mixture, and it is common that the system constitutes at least about 70 w/o. Continuing development with respect to the Bunsen reaction in such an overall process has shown that there may be further advantages in employing higher temperatures and even greater relative amounts of iodine, so that the resultant, more dense phase will be a mixture containing more than 75 w/o of iodine.

There are several major considerations in separating the components of such a liquid mixture. One is to remove the iodine so that it can be returned to use in the Bunsen reaction without undergoing a heat loss as a result of having to vaporize the $I_2$ at some later stage of the overall process. Another is to remove the iodine in a manner that does not chemically effect the hydrogen iodide. Still another is to produce an extract stream from which hydrogen iodide can thereafter be separated from the water to obtain hydrogen iodide in a substantially pure form, from which hydrogen can be produced, e.g., by thermal decomposition. Separation of hydrogen iodide from water is further complicated by the fact that simple distillation cannot be used to obtain anhydrous HI because HI and water form an azeotrope of 57.3 w/o HI and 42.7 w/o water. Thus, HI cannot be distilled out of a subazeotropic composition, i.e., less than about 57 w/o HI, at atmospheric pressure and can only be partially distilled from a superazeotropic one. The extractive distillation is considered to have its greatest advantage when separating a liquid mixture having a near-azeotropic composition which for purposes of this application, is defined as having HI in an amount of between about 40 and 70 w/o based upon HI plus $H_2O$. As a result of the conditions under which the Bunsen reaction will likely be carried out, the more dense phase is expected to have somewhat more HI, by weight than water and in most instances, the ratio of HI to water will be near the azeotropic value.

Although in the liquid mixture much of the iodine will be complexed with hydrogen iodide to form hydrogen polyiodides, e.g., $HI_3$, $HI_5$, $HI_7$, etc., this complexing is not detrimental to the present invention because, as water is removed during the countercurrent extraction, the complexes break down to $I_2$ and HI. Accordingly, although it should be understood that such complexes exist, the description, for the sake of simplicity, hereinafter speaks of the liquid mixture as including hydrogen iodide, iodine, and water without further reference to the complexing.

As earlier indicated, elemental iodine is recovered by treatment of the liquid mixture with phosphoric acid. Although the term "phosphoric acid" is used generally throughout the specification, the term should be understood to include $H_3PO_4$ as well as dehydrated species thereof, such as $H_4P_2O_7$ and $P_2O_5$. The effectiveness of the phosphoric acic depends upon the $H_3PO_4$ concentration, and it may be used in amounts which vary from about 50 w/o to about 110 w/o, or even higher. Of course, such amounts of greater than 100 w/o $H_3PO_4$ means that there is inclusion of the dehydrated species. Phosphoric acid interacts with the liquid mixture to bind the water, and it was also surprisingly found that HI is preferentially dissolved by the concentrated phosphoric acid. Thus, as a result of treating the liquid mixture with concentrated phosphoric acid in a countercurrent reactor 11 at a temperature above the melting point of iodine, a surprisingly good separation of relatively pure liquid iodine can be effected.

The countercurrent extractor 11 is preferably vertically oriented so that gravitational force is utilized to separate the more dense liquid iodine or raffinate, from the less dense phosphoric acid mixture, or extract. In this respect, the primarily liquid iodine raffinate will have a density of about 3 $g/cm^3$ while concentrated phosphoric acid will be only about 1.5 $g/cm^3$. The countercurrent extractor 11 may be a packed column, a multiple-plate column, or a multiple-stage stirred contactor. Where a multiple-plate column is used, one which includes horizontally-extending baffle plates is preferred.

A concentrated phosphoric acid stream 13 is introduced into the countercurrent extractor 11 at a location spaced slightly above its lower end from which a bottom stream 15 of iodine is being removed. Similarly, an incoming stream 17 of the liquid mixture containing the iodine, hydrogen iodide, and water is fed into the extractor 11 at a location just below the top from which an overhead extract stream 19 will be removed. By using concentrated phosphoric acid wherein the $H_3PO_4$ equivalent is at least 90 w/o, it has been found that the liquid iodine bottom stream 15, which exits the countercurrent extractor 11, will contain more than 95 w/o $I_2$ and will often be in the range of 98 to 99 w/o $I_2$. Preferably, concentrated phosphoric acid containing between 95 and 105 w/o $H_3PO_4$ is used and results in the higher weight-percent yields indicated above. Moreover, the concentrated phosphoric acid is surprisingly excellent at extracting HI along with the water, and thus the amount of HI in the stream 15 will usually be less than about 3 w/o. Although a still higher concentration of phosphoric acid could be employed, it is generally not felt worthwhile to concentrate the phosphoric acid to such an extent.

The temperature of the countercurrent extraction column 11 at the bottom will generally be between the melting or freezing point of the iodine (i.e., about 114° C. for pure iodine and slightly lower for iodine containing impurities) and about 160° C. The temperature may be slightly higher or lower at the top of the column because the freezing point of iodine is depressed by the other components of the mixture. The temperature of the countercurrent column 11 is generally achieved by adjusting the temperature of the incoming streams and/or by incorporating heating or cooling devices in the column. Because it is desired to carry out the countercurrent extraction as a liquid-liquid extraction, the pressure under which the column is operated is generally chosen to prevent vaporization. The column 11 may be operated at atmospheric pressure at a temperature near the melting point of iodine; however, it may be operated at pressures up to about 20 atmospheres at higher temperatures. It is common to operate the column at a pressure between about 2 and about 4 atm., and generally it is not felt necessary to use a pressure higher than about 6 atmospheres.

The extract stream 19 leaving the top of the column 11 should not contain more than about 20 w/o $I_2$, and generally the countercurrent extraction is so effective that its $I_2$ content is below about 10 w/o and often as low as about 5 w/o. The iodine stream 15 exiting the bottom of the column may be discharged into a clean-up extractor 21 wherein it is washed with a small amount of water which is fed in through the line 23 and which removes any residual $H_3PO_4$ as well as any trace amounts of hydrogen iodide, as for example by a further countercurrent extraction step. The clean iodine exits through a bottom discharge line 25 and is returned to the main reaction. The concentrated phosphoric-acid-containing wash is returned through a line 27 to the appropriate level of the column 11.

The extract 19 from the top of the countercurrent extractor 11 is fed into an intermediate location of an extractive distillation column 31. With the major portion of the iodine already removed, extractive distillation using additional concentrated phosphoric acid has been found to be effective to break the azeotrope and produce an overhead stream 33 of substantially anhydrous hydrogen iodide. The extractive distillation column 31 temperatures should be generally lower at the top than at the bottom. The top temperature is selected so as to effectively dehydrate the HI (by minimizing the boiling of $H_2O$), yet it should be high enough to distill off the $I_2$. The bottom temperature should assure boiling of the HI-free, water-rich phosphoric acid bottoms, and it may be between about 160° and 220° C., although temperatures up to about 280° C. may be employed depending upon the $H_3PO_4$ concentration and the pressure.

The amount and the concentration of the phosphoric acid stream 35 which is fed into the extractive distillation column 31 depends upon a large number of factors, such as the completeness of the separation desired, the amount of recycle to be allowed, the desired degree of dehydration of the HI overhead stream, and the overall system which includes the content of the incoming stream from the countercurrent extractor 11. In general, it is felt that for the extractive distillation to be most effective, the concentration of phosphoric acid in the bottom stream 37 from the column 31 should be at least 80 w/o $H_3PO_4$, and preferably at least about 85 w/o $H_3PO_4$, in order to eliminate the water-HI azeotrope and permit full recovery of HI. On the other hand, if too high a bottom concentration of $H_3PO_4$ is maintained, an excessive amount of recycling is required or concentration of phosphoric acid to a high degree is needed. The infeed of concentrated phosphoric acid into the extractive distillation column 31 at the upper location through the line 35 is adjusted, both from a flow rate and from a concentration standpoint, to achieve this desired balance in the bottoms, and concentrated phosphoric acid between 90 w/o and about 110 w/o is usually supplied.

The distillate from the column 31 is substantially anhydrous HI, i.e., has not more than about 5 w/o $H_2O$, and may be dried, if desired, as by further distillation or the like, to even further reduce the minor percentage of water. Depending upon the amount of iodine which was carried over into the extractive distillation from the countercurrent reactor 11, it may be desirable to feed the distillate to a separator 39 where iodine is condensed for return to the main Bunsen reaction. The hydrogen iodide is then transferred through a line 41 to a hydrogen recovery unit, from which elemental hydrogen is recovered—however, the HI decomposition forms no part of the present invention.

The bottom stream 37 exiting the extractive distillation column 31 may also be passed to a separator 43 to remove any iodine, for example, by cooling to a temperature so as to precipitate solid iodine. The remaining stream 45, which contains primarily $H_3PO_4$ and water, is fed to a concentrator 46, which is usually a flash distillation unit or a multiple plate distillation still. Water which may contain some very small amount of hydrogen iodide and/or iodine is distilled in the concentrator 46, and an overhead stream 47 from the concentrator is returned to the main Bunsen reaction. Should the amount of hydrogen iodide in the overhead stream leaving the flash distillation unit be significant enough to recover at this point (e.g., at least about 3 w/o), the overhead stream 47 could be directed to a further multiple plate still (not shown) which could be operated to produce essentially pure water plus a bottom fraction of about the azeotropic concentration, which could be returned to the appropriate plate of the extractive distillation column 31.

Should it be desired to employ concentrated phosphoric acid of different weight-percents of $H_3PO_4$ in the countercurrent extractor 11 and in the extractive distillation column 31, a second concentrator or still 51 can be employed. In such instance, the first concentrator 46 might be used to raise the $H_3PO_4$ content to the desired lower level, for example, for the countercurrent extractor 11, and the discharge stream 49 would be split. One portion of it would be delivered to the line 13 leading to the extractor 11 while the remainder is further concentrated in the second still 51 to produce more highly concentrated $H_3PO_4$, which is then sent through the line 35 as the infeed to the extractive distillation column 31.

As an example of the overall process, a representative stream that might be separated from a reactor carrying out the Bunsen reaction contains about 80 w/o $I_2$, 11 w/o HI and 9 w/o water. This liquid mixture is continuously fed into a packed bed, countercurrent extraction column 11 at a location just below the upper end thereof. At a location just above the lower end, a phosphoric acid stream 13, having an equivalent amount of $H_3PO_4$ of about 100 w/o, is fed into the column at a flow rate of about 0.46 times the infeed rate of the liquid mixture.

The extraction column 11 is operated at a pressure of about 2.5 atm. and a temperature of about 115° C. at the lower end and about 110° C. at the upper end. The descending liquid stream 15 which is discharged from the bottom of the column 11 contains about 98 w/o $I_2$, with the remainder being mainly water and $H_3PO_4$. The extract stream 19 which leaves the top of the column contains about 65 w/o $H_3PO_4$ and about 5 w/o $I_2$. The remainder of the stream has a $HI:H_2O$ ratio of about 55 parts by weight to 45 parts by weight.

The extract stream 19 is fed into an extractive distillation column 31 at a location somewhat above the vertical center, and a stream 35 of concentrated phosphoric acid is fed into the column 13 at a higher location. The phosphoric acid constitutes about 100 w/o $H_3PO_4$, and the flow rate of the phosphoric acid is about 0.07 times the infeed rate of the extract stream. The extractive distillation column 31 is operated at a bottom temperature of about 160° C. and a pressure of about 1 atm. The overhead vapor stream 33 from the column 31 is substantially anhydrous hydrogen iodide, containing less than about 3 w/o water. The bottom stream 37 exiting from the column contains about 85 w/o $H_3PO_4$. After separation of iodine, this phosphoric acid stream 45 is reconcentrated to provide infeed for the columns 11 and 31.

Although the invention has been described with respect to certain preferred embodiments, it should be understood that modifications as would be obvious to one having the ordinary skill of the art may be made without deviating from the scope of the invention which is defined by the appended claims.

Various features of the invention are emphasized in the claims which follow.

What is claimed is:

1. A process for separating the components of a liquid solution containing more than 50 w/o iodine plus HI and water wherein much of said iodine may be complexed with the HI in the form of hydrogen polyiodides, which process comprises continuously treating said liquid solution by countercurrent extraction, at a temperature sufficient to maintain iodine in liquid form, with phosphoric acid containing an equivalent weight percent of $H_3PO_4$ of at least about 90 w/o to produce two continuous streams, a bottom stream which is generally completely molten iodine dissociated from any hydrogen polyiodide complexes and an overhead stream containing water, HI, $H_3PO_4$ and no more than a minor amount of iodine relative to the amount of iodine in said original liquid solution.

2. A process in accordance with claim 1 wherein said countercurrent extraction is carried out at a pressure of at least about 2 atmospheres.

3. A process in accordance with claim 1 wherein said countercurrent extraction is carried out at a pressure between about 1 atmosphere and 20 atmospheres.

4. A process in accordance with claim 3 wherein said extraction is carried out at a bottom temperature between about 114° C. and about 160° C.

5. A process in accordance with claim 4 wherein said phosphoric acid has an equivalent $H_3PO_4$ content of between about 95 and 105 w/o.

6. A process in accordance with claim 5 wherein said bottom stream produced by said continuous extraction step contains at least about 97 w/o $I_2$.

7. A process in accordance with claim 5 wherein said overhead stream contains not more than about 5 w/o $I_2$.

8. A process in accordance with claim 1 wherein said overhead stream contains HI and $H_2O$ in near-azeotropic proportions and wherein said overhead stream is treated by extractive distillation using additional concentrated phosphoric acid and a bottom temperature of at least about 160° C. to create a vapor stream containing a major portion of HI and a bottom stream containing at least about 85 w/o $H_3PO_4$.

9. A process in accordance with claim 8 wherein a portion of said extractive distillation bottom stream is concentrated to provide the phosphoric acid infeed for said countercurrent extractor.

10. A process in accordance with claim 9 wherein a portion of said concentrated bottom stream is further concentrated to provide the phosphoric acid infeed for said extractive distillation step.

11. A process in accordance with claim 1 wherein said extraction is carried out in a packed column.

12. A process in accordance with claim 1 wherein said extraction is carried out in a multiple plate column.

13. A process for separating the components of a liquid solution consisting essentially of iodine, HI, and water with iodine constituting at least about 50 w/o and with HI and water present in near-azeotropic proportions, wherein much of said iodine may be complexed with the HI in the form of polyiodides, which process comprises treating said liquid solution in a countercurrent extraction zone with phosphoric acid containing an equivalent weight percent of $H_3PO_4$ of at least about 90 w/o so that two streams are produced, a bottom stream which is primarily molten iodine dissociated from any hydrogen polyiodide complexes and an overhead stream containing water, HI, $H_3PO_4$ and no more than a minor amount of iodine relative to the iodine content of said original liquid solution, withdrawing said overhead stream and feeding same to an extractive distillation zone wherein it is treated with additional concentrated phosphoric acid to create a vapor stream containing a major portion of HI and a bottom stream which contains at least about 85 w/o $H_3PO_4$, and concentrating said bottom stream from said extractive distillation zone to provide phosphoric acid infeed for said countercurrent extraction zone and for said extractive distillation zone.

* * * * *